(12) United States Patent
Du et al.

(10) Patent No.: US 10,788,614 B2
(45) Date of Patent: Sep. 29, 2020

(54) OPTICAL MODULE AND DISPLAY DEVICE

(71) Applicants: BEIJING BOE OPTOELECTRONICS TECHNOLOGY CO., LTD., Beijing (CN); BOE TECHNOLOGY GROUP CO., LTD., Beijing (CN)

(72) Inventors: Jingjun Du, Beijing (CN); Fei Liang, Beijing (CN); Lingyu Sun, Beijing (CN); Xiuyun Chen, Beijing (CN); Daekeun Yoon, Beijing (CN); Miao Liu, Beijing (CN); Xin Gai, Beijing (CN); Zheng Wang, Beijing (CN); Fei Dong, Beijing (CN); Liyu Fang, Beijing (CN); Qingqing Ma, Beijing (CN); Xi Li, Beijing (CN); Tingxiu Hou, Beijing (CN)

(73) Assignees: BEIJING BOE OPTOELECTRONICS TECHNOLOGY CO., LTD., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 16/380,178

(22) Filed: Apr. 10, 2019

(65) Prior Publication Data

US 2019/0331844 A1      Oct. 31, 2019

(30) Foreign Application Priority Data

Apr. 27, 2018   (CN) .......................... 2018 1 0394202

(51) Int. Cl.
*F21V 7/04*      (2006.01)
*F21V 8/00*      (2006.01)
*G02F 1/13357*   (2006.01)

(52) U.S. Cl.
CPC ......... *G02B 6/0038* (2013.01); *G02B 6/0093* (2013.01); *G02F 1/1336* (2013.01);
(Continued)

(58) Field of Classification Search
None
See application file for complete search history.

(56) References Cited

U.S. PATENT DOCUMENTS

| 5,555,329 A | 9/1996 | Kuper et al. |
| 2010/0135042 A1 | 6/2010 | Tsai et al. |

FOREIGN PATENT DOCUMENTS

| CN | 1169182 A | 12/1997 |
| CN | 1734324 A | 2/2006 |

(Continued)

OTHER PUBLICATIONS

First Chinese Office Action dated Jul. 30, 2019.

*Primary Examiner* — Vip Patel
(74) *Attorney, Agent, or Firm* — Dilworth & Barrese, LLP.; Michael J. Musella, Esq.

(57) ABSTRACT

An optical module and a display device are provided; the optical module includes a light guide plate, the light guide plate includes a first surface and a second surface that are opposite; the second surface includes a plurality of non-planar portions and a plurality of planar portions; at least one of the plurality of non-planar portions is between any two adjacent planar portions; and each non-planar portion includes a first light-transmitting inclined plane inclined with respect to the plurality of planar portions.

18 Claims, 3 Drawing Sheets

(52) U.S. Cl.
CPC ............ *G02F 2001/133616* (2013.01); *G02F 2203/02* (2013.01)

(56) References Cited

FOREIGN PATENT DOCUMENTS

| | | |
|---|---|---|
| CN | 101464586 A | 6/2009 |
| CN | 101598865 A | 12/2009 |
| JP | 2012164493 A | 8/2012 |
| TW | 200846731 A | 12/2008 |

OPTICAL MODULE AND DISPLAY DEVICE

This application claims priority to Chinese patent application No. 201810394202.7 filed on Apr. 27, 2018, the disclosure of which is incorporated herein by reference as part of this application.

TECHNICAL FIELD

The embodiments of the disclosure relate to an optical module and a display device.

BACKGROUND

Liquid crystal display is a kind of display device that has been developed to be relatively mature and applied widely among many displays.

For example, liquid crystal displays include transmissive liquid crystal displays and reflective liquid crystal displays. For example, a transmissive liquid crystal display includes a transmissive display panel and a backlight source located on the back side of the transmissive display panel, light emitted from the backlight source forms imaging light that carries display information after passing through the transmissive display panel, and a user can see a display picture through the imaging light. For example, a reflective liquid crystal display includes a display panel, the display panel includes a reflective layer located on the back side (the back side is opposite to a display side) of the display panel and includes a display-side surface located on the display side, light incident from the display side of the display panel is reflected by the reflective layer to form reflected light, and the reflected light passes through the display-side surface of the display panel to form imaging light. In a situation where the reflective liquid crystal display is used under the condition of insufficient ambient light, the intensity of incident light can be supplemented by a front light source arranged on the display side of the transmissive display panel, so that the user can see a clear picture.

SUMMARY

The embodiments of the disclosure provide an optical module and a display device. The optical module has higher brightness.

At least one embodiment of the present disclosure provides an optical module including a light guide plate, the light guide plate includes a first surface and a second surface which are opposite to each other, the second surface includes a plurality of non-planar portions and a plurality of planar portions, at least one of the plurality of non-planar portions is disposed between any two adjacent ones of the plurality of planar portions, and each non-planar portion includes a first light-transmitting inclined plane inclined with respect to the plurality of planar portions.

For example, each non-planar portion further includes a second light-transmitting inclined plane inclined with respect to the plurality of planar portions, and an inclination direction of the second light-transmitting inclined plane is opposite to an inclination direction of the first light-transmitting inclined plane.

For example, each non-planar portion further includes a light-transmitting surface located between the first light-transmitting inclined plane and the second light-transmitting inclined plane.

For example, the plurality of non-planar portions include a plurality of first non-planar portions and a plurality of second non-planar portions, and an inclination angle of the first light-transmitting inclined plane of each second non-planar portion with respect to the first surface is smaller than an inclination angle of the first light-transmitting inclined plane of each first non-planar portion with respect to the first surface.

For example, a one-piece structure is formed by the plurality of non-planar portions and a portion, other than the plurality of non-planar portions, of the light guide plate.

For example, the plurality of planar portions are transparent.

For example, the plurality of planar portions includes a plurality of first planar portions and a plurality of second planar portions; in an arrangement direction of the first planar portions and the second planar portions, a size of each first planar portion is smaller than a size of each second planar portion.

For example, the optical module further includes a light source disposed at a lateral end of the light guide plate.

For example, the first light-transmitting inclined plane includes a first end close to the first surface and a second end away from the first surface; the second end is located between the first end and the light source in a direction perpendicular to the arrangement direction of the first surface and the second surface.

For example, the plurality of non-planar portions include first non-planar portions and second non-planar portions located between the first non-planar portions and the light source, and an inclination angle of the first light-transmitting inclined plane of each second non-planar portion with respect to the first surface is smaller than an inclination angle of the first light-transmitting inclined plane of each first non-planar portion with respect to the first surface.

For example, a refractive index of the light guide plate is greater than a refractive index of a medium that contacts the first surface of the light guide plate.

For example, the plurality of planar portions include first planar portions and second planar portions located between the first planar portions and the light source; in the arrangement direction of the first planar portions and the second planar portions, a size of each first planar portion is smaller than a size of each second planar portion.

For example, the refractive index of the light guide plate is greater than a refractive index of the medium that contacts the second surface of the light guide plate.

For example, the optical module further includes a first protective layer, the first surface of the light guide plate is located between the first protective layer and the second surface of the light guide plate, and a refractive index of the first protective layer is smaller than that of the light guide plate.

For example, the optical module further includes a second protective layer, and the second surface of the light guide plate is located between the second protective layer and the first surface of the light guide plate.

For example, a cavity is formed between the second protective layer and the second surface of the light guide plate.

For example, the optical module further includes a support portion located between the light guide plate and the second protective layer.

At least one embodiment of the present disclosure also provides a display device including the optical module described in any one of the above embodiments.

For example, the display device further includes a display panel, and the second surface of the light guide plate of the optical module is located between the first surface of the light guide plate and the display panel.

For example, the optical module is disposed on a display side of the display panel.

In the embodiments of the present disclosure, the non-planar portions are advantageous to make the light that enters the light guide plate from the lateral end of the light guide plate perpendicular to the first surface of the light guide plate as much as possible after exiting from the non-planar portions of the light guide plate, so the optical module has higher brightness.

BRIEF DESCRIPTION OF THE DRAWINGS

In order to clearly illustrate the technical solution of the embodiments of the disclosure, the drawings of the embodiments will be briefly described in the following; it is obvious that the described drawings are only related to some embodiments of the disclosure and thus are not limitative of the disclosure.

DETAILED DESCRIPTION

In order to make objects, technical details and advantages of the embodiments of the disclosure apparent, the technical solutions of the embodiments will be described in a clearly and fully understandable way in connection with the drawings related to the embodiments of the disclosure. Apparently, the described embodiments are just a part but not all of the embodiments of the disclosure. Based on the described embodiments herein, those skilled in the art can obtain other embodiment(s), without any inventive work, which should be within the scope of the disclosure.

Unless otherwise defined, all the technical and scientific terms used herein have the same meanings as commonly understood by one of ordinary skill in the art to which the present disclosure belongs. The terms "first," "second," etc., which are used in the description and the claims of the present application for disclosure, are not intended to indicate any sequence, amount or importance, but distinguish various components. The terms "comprise," "comprising," "include," "including," etc., are intended to specify that the elements or the objects stated before these terms encompass the elements or the objects and equivalents thereof listed after these terms, but do not preclude the other elements or objects. The phrases "connect", "connected", etc., are not intended to define a physical connection or mechanical connection, but may include an electrical connection, directly or indirectly. "On," "under," "right," "left" and the like are only used to indicate relative position relationship, and when the position of the object which is described is changed, the relative position relationship may be changed accordingly.

Figure 1:
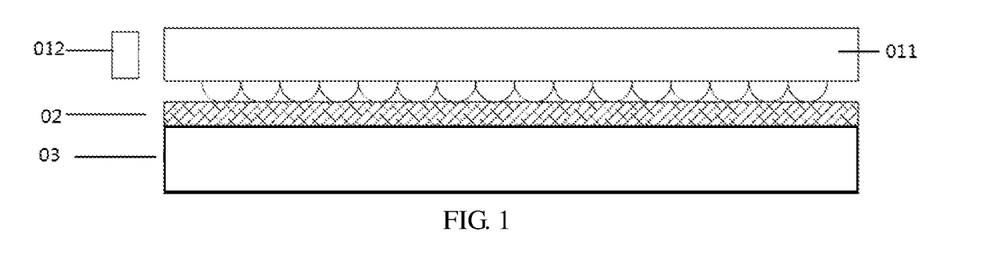
FIG. 1 is a schematic structural view of a reflective liquid crystal display including a front light source.

FIG. 1 is a schematic structural view of a reflective liquid crystal display including a front light source. As shown in FIG. 1, the liquid crystal display includes a display panel 03 and the front light source located on the display side of the display panel 03, the front light source includes a light guide plate 011 and a light source 012, the light guide plate 011 is connected to the display panel 03 through an optical adhesive 02, and a surface that is included by the light guide plate 011 and is close to the display panel 03 is provided with a plurality of hemispherical scattering dots.

The inventors of the present application noticed in the research that in the liquid crystal display shown in FIG. 1, light emitted from the light source 012 is easily emitted from the upper surface that is included by the light guide plate 011 and is away from the display panel 03, which results in lower brightness of the front light source including the light source 012 and the light guide plate 011.

The inventors of the present application also noticed that for the reflective liquid crystal display, when the light emitted from the light guide plate 011 of the front light source is vertically incident on the display panel 03, more effective light enters the display panel 03, and thus the reflection effect of the display panel 03 is better; when the propagation direction of the light emitted from the light guide plate 011 has an inclination angle which is relatively large with respect to the display panel 03, the effective light entering the display panel 03 decreases, and the reflection effect of the display panel 03 deteriorates.

The embodiments of the disclosure provide an optical module and a display device including the optical module. The optical module includes a light guide plate, the light guide plate includes a first surface and a second surface that are opposite, the second surface includes a plurality of non-planar portions and a plurality of planar portions, the planar portions are substantially parallel to the first surface, at least one of the plurality of non-planar portions is arranged between any two adjacent planar portions, and each non-planar portion includes a first light-transmitting inclined plane that is inclined with respect to the plurality of planar portions and the first surface.

In the embodiments of the present disclosure, by arranging the non-planar portions provided with the first light-transmitting inclined planes at the second surface of the light guide plate, it is advantageous to make the refracted light that is formed by the light in the light guide plate after passing through the first light-transmitting inclined planes perpendicular to the first surface of the light guide plate as far as possible, that is, the non-planar portions are more advantageous to make the refracted light perpendicular to the first surface of the light guide plate (i.e., to make the refracted light have a better light gathering effect) than the hemispherical scattering dots in FIG. 1, so the embodiments of the present disclosure are advantageous to improve the brightness of the optical module.

Figure 2A:
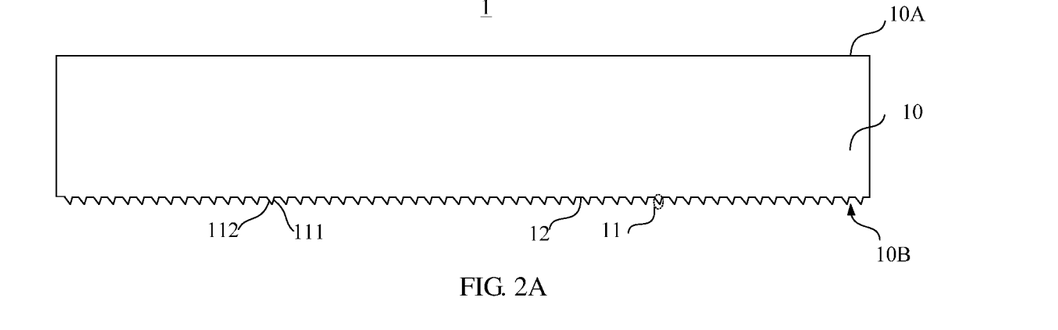
FIG. 2A is a schematic structural view 1 of an optical module according to at least one embodiment of the present disclosure.
Figure 2B:
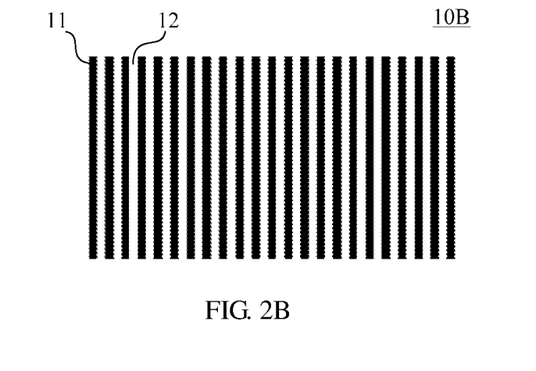
FIG. 2B is a schematic plan view of the second surface of the light guide plate included in the optical module of FIG. 2A.

For example, as shown in FIG. 2A, at least one embodiment of the present disclosure provides an optical module 1 that includes a light guide plate 10, the light guide plate 10 includes a first surface 10A which is generally planar and a second surface 10B which has a plurality of non-planar portions 11, and the first surface 10A and the second surface 10 are opposite to each other. The principal cross-section of the non-planar portion 11 has a plurality of sides intersecting each other (as shown in FIG. 2A), and the orthographic projection of the non-planar portion 11 on the plane in which the first surface 10A is located has strip structures (as shown in FIG. 2B). The second surface 10B further includes a plurality of planar portions 12, the planar portions 12 are substantially parallel to the first surface 10A, and one of the plurality of non-planar portions 11 is disposed between each adjacent two planar portions 12. FIG. 2A and FIG. 2B illustrate an example in which one non-planar portion 11 is provided between any two adjacent planar portions 12. In other embodiments, multiple ones of the plurality of non-planar portions 11 may be provided between any two adjacent planar portions 12. With continued reference to FIG. 2A, each non-planar portion 11 includes a first light-transmitting inclined plane 111 inclined with respect to the plurality of planar portions 12 and the first surface 10A, and the first light-transmitting inclined plane 111 is a plane rather than a curved surface.

In the embodiments of the present disclosure, the principal cross-section of the non-planar portion 11 is perpendicular to the first surface and parallel to the arrangement direction of the first light-transmitting inclined planes 111 of the plurality of non-planar portions 11.

For example, as shown in FIG. 2B, the second surface 10B of the light guide plate 10 is provided with the plurality of non-planar portions 11 ranking in a row direction and extending in a column direction, so that the manufacturing process of the non-planar portions 11 can be simplified. For example, in other embodiments, the second surface 10B of the light guide plate 10 is provided with the non-planar portions 11 arranged in a plurality of rows and in a plurality of columns.

For example, the non-planar portion 11 protrudes toward a side away from the first surface 10A with respect to the planar portion 12 (as shown in FIG. 2A). For example, in other embodiments, the non-planar portion 11 is recessed toward the first surface 10A with respect to the planar portion 12.

For example, as shown in FIG. 2A, each non-planar portion 11 further includes a second light-transmitting inclined plane 112 inclined with respect to the plurality of planar portions 12, and the second light-transmitting inclined plane 112 has an inclination direction opposite to the inclination direction of the first light-transmitting inclined plane 111. In the embodiment of the present disclosure, the second light-transmitting inclined plane 112 can not only transmit part of the light in the light guide plate 10 to form the refracted light, but also help to make the refracted light perpendicular to the first surface 10A as much as possible, so the brightness of the optical module can be further improved by arranging the first light-transmitting inclined plane 111 and the second light-transmitting inclined plane 112 with opposite inclination directions.

For example, along the arrangement direction of the plurality of non-planar portions 11, the maximum size of each non-planar portion 11 does not exceed 10 microns. The size of the non-planar portion should not be too large to ensure a better light gathering effect.

Figure 2C:
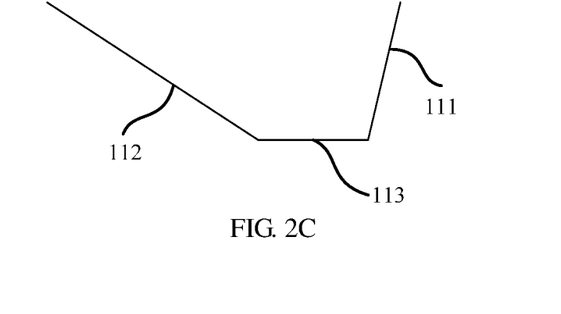
FIG. 2C is a schematic view 1 of a principal cross-section of a non-planar portion in the optical module according to at least one embodiment of the present disclosure.

For example, the second light-transmitting inclined plane 112 is directly connected with the first light-transmitting inclined plane 111, as shown in FIG. 2A. In other embodiments, as shown in FIG. 2C, the non-planar portion 11 further includes a light-transmitting surface 113 located between the first light-transmitting inclined plane 111 and the second light-transmitting inclined plane 112. The examples of the shape of the principal cross-section of the non-planar portion 11 in the embodiments of the present disclosure include, but are not limited to, the embodiments shown in FIG. 2A and FIG. 2C.

Figure 3:
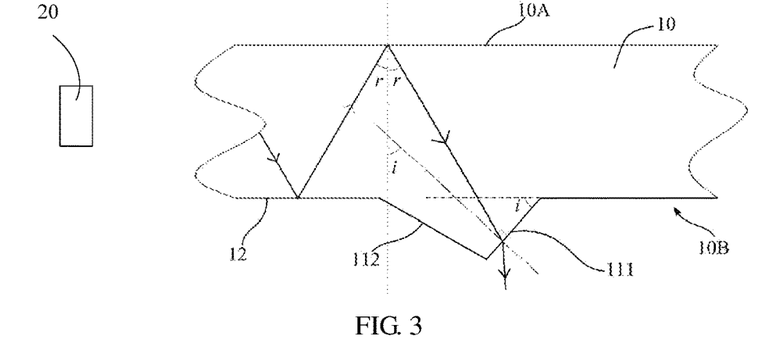
FIG. 3 is a schematic diagram showing the propagation of partial light in the light guide plate included in the optical module of FIG. 2A.

The operation principle of the light guide plate 10 provided in the embodiments of the present disclosure will be described below with reference to FIG. 3. As shown in FIG. 3, during use, light emitted from the light source 20 in the optical module enters the light guide plate 10 from the lateral end (hereinafter referred to as the light incident end) of the light guide plate 10. Light in the light guide plate 10 is reflected by the first surface 10A and the plurality of planar portions 12 of the light guide plate 10 for many times to propagate in the light guide plate 10 in a direction away from the light incident end; in the situation where the light in the light guide plate 10 is incident on the first light-transmitting inclined plane 111, the refracted light formed by most of the light after passing through the first light-transmitting inclined plane 111 is deflected toward the vertex angle direction of the non-planar portion 11, that is, the included angle between the refracted light and the first surface 10A is larger than the included angle between the most of the light and the first surface 10A, so that the refracted light is perpendicular to the first surface of the light guide plate as much as possible, and thus the optical module has higher brightness.

It should be noted that FIG. 3 only schematically shows the propagation path of a part of light in the light guide plate 10, and there are other kinds of light propagation paths in the light guide plate 10.

For example, the refractive index of the light guide plate 10 is larger than the refractive index of the medium adjacent to the second surface 10B (namely the medium contacts the second surface 10B) of the light guide plate 10, in order to deflect the refracted light that is formed by the most of the light after passing through the first light-transmitting inclined plane 111 toward the vertex angle direction of the non-planar portion 11. For example, the medium is air or other gas.

For example, with continued reference to FIG. 3, the incident angle of light entering the light guide plate 10 from the lateral end of the light guide plate 10 with respect to the first surface 10A is r, and the inclination angle of the first light-transmitting inclined plane 111 with respect to the first surface 10A is i; in the situation where the refractive index of the light guide plate 10 is larger than the refractive index of the medium adjacent to the second surface 10B of the light guide plate 10, in order to deflect the refracted light formed by the most of the light after passing through the first light-transmitting inclined plane 111 toward the vertex angle direction of the non-planar portion 11, the relationship between the incident angle r and the inclination angle i of the first light-transmitting inclined plane 111 is: $r < i$.

For example, the planar portion 12 included by the second surface 10B is transparent. In a case where the refractive index of the light guide plate 10 is greater than the refractive index of the medium adjacent to the second surface 10B of the light guide plate 10, for each of at least a part of the planar portions 12, because the planar portion 12 is transparent, when light in the light guide plate 10 is incident on the planar portion 12, there may be a phenomenon that: light having an incident angle greater than or equal to the total reflection angle is reflected by the planar portion 12, and light having an incident angle smaller than the total reflection angle is transmitted out of the planar portion 12. Therefore, by setting the planar portion 12 to be transparent, it is advantageous to further improve the brightness of the optical module 1.

For example, the optical module 1 provided in the embodiments of the present disclosure may be a front light source which is configured to be provided on the display side of the display panel. In this case, the second surface 10B of the light guide plate 10 included in the optical module 1 is located between the first surface 10A and the display panel, the light emitted from the second surface 10B of the light guide plate 10 irradiates the display panel and forms reflected light after being reflected by the display panel, and the reflected light sequentially passes through the second surface 10B and the first surface 10A of the light guide plate 10 to form imaging light that carries display information.

For example, in the case where the optical module 1 is the front light source, the first surface 10A of the light guide plate 10 is transparent, and the refractive index of the light guide plate 10 is larger than the refractive index of the medium adjacent to the first surface 10A (namely the medium contacts the first surface 10A) of the light guide plate 10. This is advantageous for the light in the light guide plate 10 to generate the total reflection when it is irradiated to the first surface 10A, thereby being advantageous for preventing the light incident from the lateral end of the light guide plate 10 from directly transmitting out from the first surface 10A, and further improving the utilization rate of the light.

For example, in the case where the optical module 1 is the front light source, the first surface 10A of the light guide plate 10 is polished to make the light incident on the first surface 10A more prone to generate the total reflection.

For example, the optical module 1 provided by the embodiments of the present disclosure may be a backlight source which is configured to be placed away from the display side of the display panel. In this case, the second surface 10B of the light guide plate 10 included in the optical module 1 is located between the first surface 10A and the display panel, and the light emitted from the second surface 10B of the light guide plate 10 directly passes through the display panel after being irradiated on the display panel to form the imaging light that carries the display information.

For example, in the situation where the optical module 1 is the backlight source, the first surface 10A of the light guide plate 10 is a reflective surface or is provided with a reflective structure, so that the light in the light guide plate 10 is reflected by the first surface 10A.

Figure 4A:
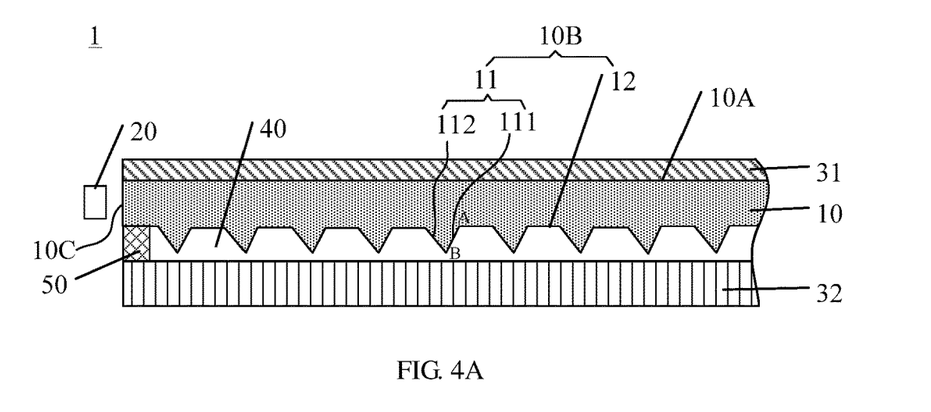
FIG. 4A is a schematic structural view 2 of the optical module according to at least one embodiment of the present disclosure.

For example, as shown in FIG. 4A, the optical module 1 provided by at least one embodiment of the present disclosure further includes a light source 20 disposed at the lateral end of the light guide plate 10, and the lateral end is close to a position where the first surface 10A and the second surface 10B of the light guide plate 10 are connected. For example, the first surface 10A and the second surface 10B of the light guide plate 10 are connected through the lateral surface 10C of the light guide plate 10, and at least part of the light emitted from the light source 20 enters the light guide plate 10 from the lateral surface 10C. In other embodiments, at least part of the light emitted by the light source 20 may also enter the light guide plate 10 from the edge region of the first surface 10A or from the edge region of the second surface 10B. The embodiments of the present disclosure do not limit the incident surface of the light, as long as the light emitted from the light source 20 can be incident from the lateral end of the light guide plate 10.

For example, as described above, the incident angle r of the light entering the light guide plate 10 from the lateral end of the light guide plate 10 at the first surface 10A is smaller than the inclination angle i of the first light-transmitting inclined plane 111, which is advantageous for deflecting the refracted light that is formed by the most of the light in the light guide plate 10 after passing through the first light-transmitting inclined plane 111 toward the vertex angle direction of the non-planar portion 11.

For example, in the situation where the optical module 1 is the front light source, the incident angle r is also greater than or equal to the total reflection critical angle C1 at the first surface 10A; in the case where the optical module 1 is the backlight source and the planar portion 12 which is transparent is used, because the planar portion 12 is substantially parallel to the first surface 10A, in order that the light in the light guide plate 10 are totally reflected at the planar portion 12, the incident angle r is also greater than or equal to the total reflection critical angle C2 at the planar portion 12.

For example, the light source 20 is a light emitting diode or an organic light emitting diode or other types of light-emitting devices.

For example, as shown in FIG. 4A, the first light-transmitting inclined plane 111 includes a first end A close to the first surface 10A and a second end B away from the first surface 10A; the second end B is located between the first end A and the light source 20 in a direction perpendicular to the arrangement direction of the first surface 10A and the second surface 10B. In the non-planar portion 11, the second end B of the first light-transmitting inclined plane 111 is closer to the light source 20 than the first end A. Therefore, when the light in the light guide plate 10 is irradiated to the non-planar portion 11, it is mainly irradiated to the first light-transmitting inclined plane 111.

Figure 4B:
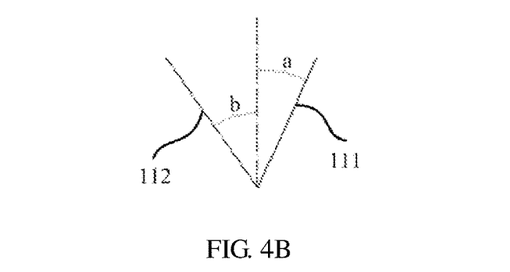
FIG. 4B is a schematic view 2 of the principal cross-section of the non-planar portion in the optical module according to at least one embodiment of the present disclosure.

For example, in the case where the second end B of the first light-transmitting inclined plane 111 is located between the first end A and the light source 20, the included angle between the first light-transmitting inclined plane 111 and the first surface 10A is larger than the included angle between the second light-transmitting inclined plane 112 and the first surface 10A. That is, as shown in FIG. 4B, the included angle a between the first light-transmitting inclined plane 111 and the normal line of the first surface 10A (shown by dashed line) is smaller than the included angle b between the second light-transmitting inclined plane 112 and the normal line. This is advantageous for improving the light gathering effect of the non-planar portion 11.

For example, as shown in FIG. 4A, the optical module 1 provided by at least one embodiment of the present disclosure further includes a first protective layer 31, the first surface 10A of the light guide plate 10 is located between the first protective layer 31 and the second surface 10B of the light guide plate 10, and the refractive index of the first protective layer 31 is smaller than the refractive index of the light guide plate 10. The first protective layer 31 is adjacent to the first surface 10A of the light guide plate 10 for protecting the first surface 10A. In the situation where the optical module 1 is the front light source, the first protective layer 31 is transparent and has a refractive index smaller than that of the light guide plate 10, so that the light in the light guide plate 10 is totally reflected when incident on the first surface 10A at an incident angle greater than or equal to the total reflection angle, that is, the first surface 10A is made to be a total reflection surface.

For example, as shown in FIG. 4A, the optical module 1 provided by at least one embodiment of the present disclosure further includes a transparent second protective layer 32, and the second surface 10B of the light guide plate 10 is located between the second protective layer 32 and the first surface 10A of the light guide plate 10. The second protective layer 32 is not in direct contact with the second surface 10B of the light guide plate 10 to protect the non-planar portion 11 included by the second surface 10B and to avoid affecting refraction of light in the light guide plate 10 at the first light-transmitting inclined plane 111 and the second light-transmitting inclined plane 112 of the non-planar portion 11.

For example, a cavity 40 is formed between the second protective layer 32 and the second surface 10B of the light guide plate 10. For example, air or other gas is contained in the cavity 40.

For example, the optical module 1 provided by at least one embodiment of the present disclosure further includes a support portion 50 positioned between the light guide plate 10 and the second protective layer 32 to form the cavity 40 between the second surface 10B of the light guide plate 10 and the second protective layer 32.

For example, the support portion 50 is a sealant for bonding the light guide plate 10 and the second protective layer 32 together.

Because the light from the light source 20 and entering the light guide plate 10 gradually weakens in the process of propagation in the light guide plate 10, in order to reduce the brightness difference between the light emitted from different regions of the second surface 10B of the light guide plate 10, for example, the non-planar portion 11 may have a smaller density in the region close to the light source 20 and a larger density in the region far from the light source 20, or the light gathering effect of the non-planar portion 11 close to the light source 20 may be smaller than the light gathering effect of the non-planar portion 11 far from the light source 20. The following description will be made with reference to FIG. 5 and FIG. 6.

Figure 5:
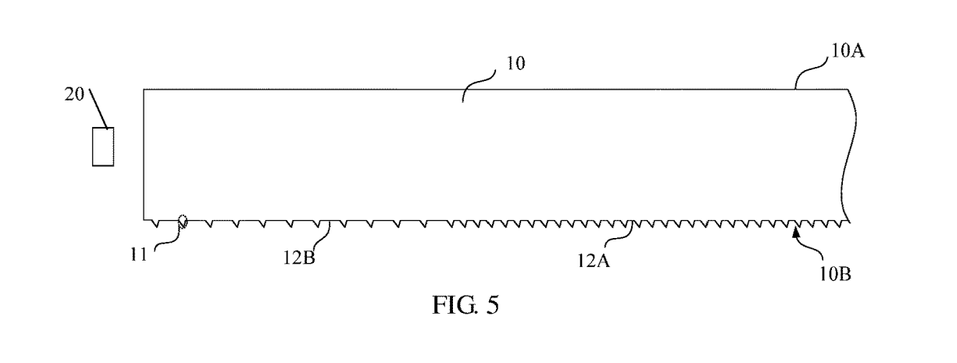
FIG. 5 is a schematic structural view 3 of the optical module according to at least one embodiment of the present disclosure.

For example, as shown in FIG. 5, the plurality of planar portions 12 included by the second surface 10B of the light guide plate 10 include a plurality of first planar portions 12A and a plurality of second planar portions 12B; in the arrangement direction of the first planar portions 12A and the second planar portions 12B, the size of each first planar portion 12A is smaller than the size of each second planar portion 12B. By providing the first planar portions and the second planar portions with different sizes, the non-planar portions 11 have different densities in different regions, so that the light guide plate 10 can also be used for adjusting the brightness uniformity of light.

For example, in the case where the optical module 1 includes the light source 20, the second planar portions 12B are located between the first planar portions 12A and the light source 20. In the embodiment of the present disclosure, because the sizes of the second planar portions 12B close to the light source 20 are larger than the sizes of the first planar portions 12A away from the light source 20, the non-planar portions 11 have a smaller density in the region close to the light source 20 and a larger density in the region away from the light source 20, thereby improving the brightness uniformity of light emitted from the second surface 10B of the light guide plate 10.

Figure 6:
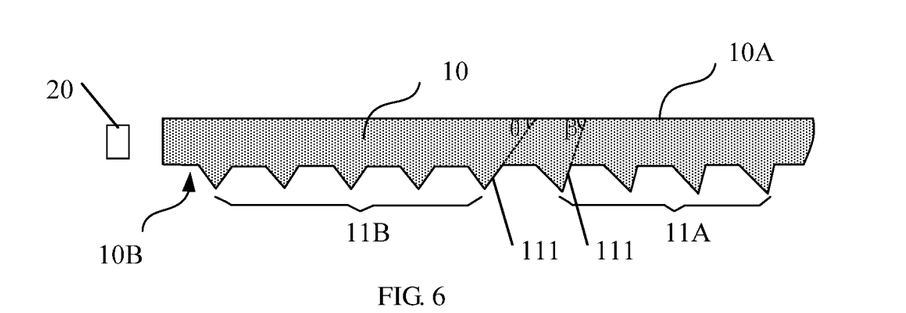
FIG. 6 is a schematic structural view 4 of the optical module according to at least one embodiment of the present disclosure.

For example, as shown in FIG. 6, the plurality of non-planar portions 11 included by the second surface 10B of the light guide plate 10 include a plurality of first non-planar portions 11A and a plurality of second non-planar portions 11B, and the inclination angle θ of the first light-transmitting inclined plane 111 of each second non-planar portion 11B with respect to the first surface 10A is smaller than the inclination angle β of the first light-transmitting inclined plane 111 of each first non-planar portion 11A with respect to the first surface 10A. By making the first light-transmitting inclined planes of the first non-planar portions and the first light-transmitting inclined planes of the second non-planar portions have different inclined angles, the non-planar portions 11 have different light gathering capabilities in different regions, so that the light guide plate 10 can also be used for adjusting the brightness uniformity of light.

For example, in the case where the optical module 1 includes the light source 20, the second non-planar portions 11B are located between the first non-planar portions 11A and the light source 20. Because the light irradiated on the non-planar portions 11 is mainly transmitted through the first light-transmitting inclined planes 111, the light gathering effect of the non-planar portions 11 far from the light source 20 can be better by making the non-planar portions far from the light source 20 have the first light-transmitting inclined planes 111 with a larger inclination angle, thereby improving the brightness uniformity of the light emitted from the second surface 10B of the light guide plate 10.

It should be noted that the embodiments of the planar portions 12 and the non-planar portions 11 include, but are not limited to, the embodiments shown in FIG. 5 and FIG. 6. For example, in other embodiments, the second surface 10B of the light guide plate 10 includes at least three kinds of planar portions 12 of different sizes and/or at least three kinds of non-planar portions 11 having the first light-transmitting inclined planes 111 of different inclination angles.

For example, in the embodiments shown in FIG. 2A, FIG. 4A, FIG. 5 and FIG. 6, the non-planar portions 12 included in the light guide plate 10 and the rest of the light guide plate 10 form a one-piece structure, i.e., the light guide plate 10 is of a one-piece structure, which is beneficial to ensuring smooth transmission of light inside the light guide plate 10.

At least one embodiment of the present disclosure also provides a display device including the optical module 1 provided in any one of the above embodiments.

Figure 7:
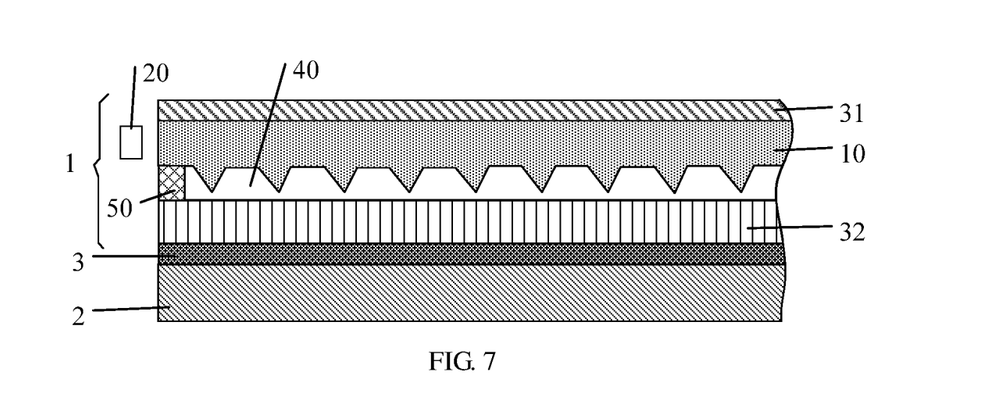
FIG. 7 is a schematic structural view of a display device according to at least one embodiment of the present disclosure.

For example, as shown in FIG. 7, the display device provided by at least one embodiment of the present disclosure further includes a display panel 2, and the second surface 10B of the light guide plate 10 of the optical module 1 is located between the first surface 10A of the light guide plate 10 and the display panel 2. That is, light entering the light guide plate 10 from the lateral end of the light guide plate 10 exits from the second surface 10B of the light guide plate 10 and enters the display panel 2.

For example, the optical module 1 is disposed on the display side of the display panel 2. In this case, the optical module 1 is a front light source, and the display panel 2 is a reflective display panel with a reflective structure (for example, the reflective structure is located on the back side of the display panel). The display panel 2 receives light emitted by the optical module 1, and the light received by the display panel 2 is reflected by the reflective structure to form reflected light, and the reflected light forms imaging light that carries display information after passing through the optical module 1. In the embodiments of the present disclosure, light is subjected to the light gathering treatment of the non-planar portions of the light guide plate 10 and then enters the display panel 2; compared with a mode in which light enters the display panel first and then undergoes the light gathering treatment, the embodiments of the present disclosure have better light gathering effect and display effect.

For example, in the case where the optical module 1 is the front light source, the optical module 1 is connected to the display panel 2 through an optical adhesive (e.g., OCA, optical clear adhesive) 3. In this case, for example, the optical module 1 includes the second protective layer 32, and the hardness of the second protective layer 32 included in the optical module 1 is greater than the hardness of the optical adhesive 3. Because the second protective layer 32 has a larger hardness, the second protective layer 32 can prevent the optical adhesive 3 from being embedded in the gap between the non-planar portions, and can prevent the non-planar portions from being damaged due to contact with the second protective layer 32.

For example, the display panel 2 is a liquid crystal panel or an electrophoretic display or other types of displays requiring the use of light sources.

Figure 8:
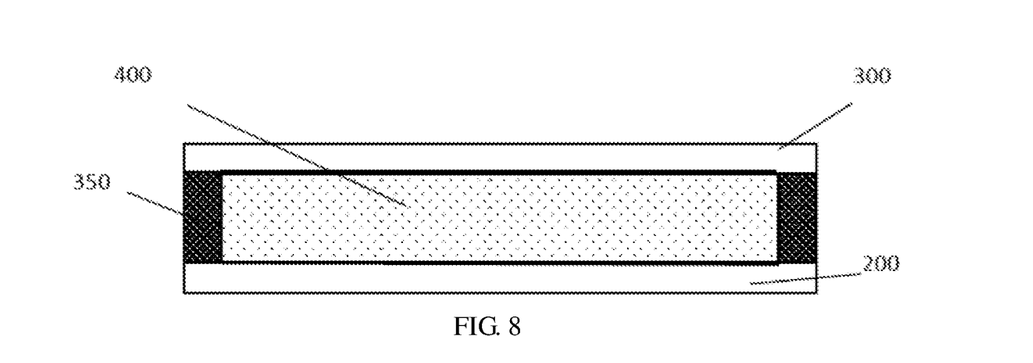
FIG. 8 is a schematic structural view of a display panel in the display device according to at least one embodiment of the present disclosure.

Taking the display panel 2 being the liquid crystal panel as an example, for example, as shown in FIG. 8, the display panel 2 includes an array substrate 200 and a counter substrate 300, the array substrate 200 and the counter substrate 300 face each other and are connected through a sealant frame 350 to form a liquid crystal cell, and the liquid crystal cell is filled with a liquid crystal material 400. The side of the counter substrate 300 away from the array substrate 200 is the display side of the display panel 200.

For example, the display device provided by the embodiments of the present disclosure is any product or component with display function such as a mobile phone, a tablet computer, a television, a display, a notebook computer, a digital photo frame, a navigator, etc.

In summary, the optical module and the display device including the optical module provided by the embodiments of the present disclosure have the following advantages.

In the embodiments of the present disclosure, the non-planar portions are advantageous to make the light that enters the light guide plate from the lateral end of the light guide plate perpendicular to the first surface of the light guide plate as much as possible after exiting from the non-planar portions of the light guide plate, so the optical module has higher brightness. Accordingly, the light emitted from the second surface of the light guide plate is as vertical as possible with respect to the display panel, so as to enter the display panel more, thereby improving the utilization rate of the light. In the situation where the optical module is a front light source, the reflection effect of light can be improved.

In some embodiments, the first surface of the light guide plate is polished or is a total reflection surface formed by providing the first protective layer, which is beneficial to prevent light incident from the lateral end of the light guide plate from directly exiting the light guide plate from the first surface, thereby improving the utilization rate of the light source.

In some embodiments, protective layers are provided at the first surface and the second surface of the light guide plate in the optical module, so that the non-planar portions and the brightness enhancement effect of the optical module can be prevented from being affected with changes in process or time, and the stability of the brightness enhancement system can be improved.

The arrangement of the same components in the above embodiments of the optical module and the display device can be referred to each other. In case of no conflict, features in one embodiment or in different embodiments can be combined.

What are described above is related to the illustrative embodiments of the disclosure only and not limitative to the scope of the disclosure; the scopes of the disclosure are defined by the accompanying claims.

What is claimed is:

1. An optical module comprising a light guide plate and a light source, wherein
   the light guide plate comprises a first surface and a second surface which are opposite to each other,
   the second surface comprises a plurality of non-planar portions and a plurality of planar portions, at least one of the plurality of non-planar portions is between any two adjacent ones of the plurality of planar portions, and
   each non-planar portion comprises a first light-transmitting inclined plane inclined with respect to the plurality of planar portions;
   each non-planar portion further comprises a second light-transmitting inclined plane inclined with respect to the plurality of planar portions, and an inclination direction of the second light-transmitting inclined plane is opposite to an inclination direction of the first light-transmitting inclined plane;
   the light source is at a lateral end of the light guide plate;
   for each non-planar portion, the second light-transmitting inclined plane is between the first light-transmitting inclined plane and the light source, and an angle between the first light-transmitting plane and the first surface is greater than an angle between the second light-transmitting plane and the first surface.

2. The optical module according to claim 1, wherein each non-planar portion further comprises a light-transmitting surface between the first light-transmitting inclined plane and the second light-transmitting inclined plane.

3. The optical module according to claim 1, wherein the plurality of non-planar portions comprise a plurality of first non-planar portions and a plurality of second non-planar portions, and an inclination angle of the first light-transmitting inclined plane of each second non-planar portion with respect to the first surface is smaller than an inclination angle of the first light-transmitting inclined plane of each first non-planar portion with respect to the first surface.

4. The optical module according to claim 1, wherein a one-piece structure is formed by the plurality of non-planar portions and a portion, other than the plurality of non-planar portions, of the light guide plate.

5. The optical module according to claim 1, wherein the plurality of planar portions are transparent.

6. The optical module according to claim 1, wherein the plurality of planar portions comprise a plurality of first planar portions and a plurality of second planar portions; in an arrangement direction of the first planar portions and the second planar portions, a size of each first planar portion is smaller than a size of each second planar portion.

7. The optical module according to claim 1, wherein
   the first light-transmitting inclined plane comprises a first end close to the first surface and a second end away from the first surface;

the second end is between the first end and the light source in a direction perpendicular to an arrangement direction of the first surface and the second surface.

8. The optical module according to claim 7, wherein
the plurality of non-planar portions comprise first non-planar portions and second non-planar portions between the first non-planar portions and the light source, and
an inclination angle of the first light-transmitting inclined plane of each second non-planar portion with respect to the first surface is smaller than an inclination angle of the first light-transmitting inclined plane of each first non-planar portion with respect to the first surface.

9. The optical module according to claim 1, wherein
the plurality of planar portions comprise first planar portions and second planar portions between the first planar portions and the light source, and
in an arrangement direction of the first planar portions and the second planar portions, a size of each first planar portion is smaller than a size of each second planar portion.

10. The optical module according to claim 1, wherein a refractive index of the light guide plate is greater than a refractive index of a medium that contacts the first surface of the light guide plate.

11. The optical module according to claim 1, wherein a refractive index of the light guide plate is greater than a refractive index of a medium that contacts the second surface of the light guide plate.

12. The optical module according to claim 1, further comprising a first protective layer, wherein the first surface of the light guide plate is between the first protective layer and the second surface of the light guide plate, and a refractive index of the first protective layer is smaller than that of the light guide plate.

13. The optical module according to claim 1, further comprising a second protective layer, wherein the second surface of the light guide plate is between the second protective layer and the first surface of the light guide plate.

14. The optical module according to claim 13, wherein a cavity is formed between the second protective layer and the second surface of the light guide plate.

15. The optical module according to claim 13, further comprising a support portion, wherein the support portion is between the light guide plate and the second protective layer.

16. A display device comprising the optical module according to claim 1.

17. The display device according to claim 16, further comprising a display panel, wherein the second surface of the light guide plate of the optical module is between the first surface of the light guide plate and the display panel.

18. The display device according to claim 17, wherein the optical module is on a display side of the display panel.

* * * * *